United States Patent Office 3,560,428
Patented Feb. 2, 1971

3,560,428
PROCESS FOR PREPARING IMPROVED PHENYLENE POLYMER LACQUERS AND PRODUCTS
Norman Bilow, Los Angeles, Calif., assignor to Hughes Aircraft Company, Culver City, Calif., a corporation of Delaware
No Drawing. Filed Sept. 5, 1967, Ser. No. 665,286
Int. Cl. C08g 33/00, 49/00; C09d 3/60
U.S. Cl. 260—33.8
9 Claims

ABSTRACT OF THE DISCLOSURE

Improved homogeneous phenylene lacquer and plastic compositions comprised of aromatic polymers of terphenyls, quaterphenyls, mixtures thereof, and mixtures of the same with other aromatic monomer and phenyl material with not more than 5 aromatic rings copolymerized with an aromatic polymethylol compound such as polyoxyxylylene and an acid catalyst by an improved method of "A" stage polymerization therein in selective solvent combinations.

---

The invention herein described was made in the course of or under a contract with the Air Force. This disclosure is related to the subject matter of application Ser. No. 349,770, filed Mar. 5, 1964, now abandoned, and the herewith filed applications, "Commercially Useful Polyphenylene Polymers and Method of Production Thereof," Ser. No. 665,262, "Method of Providing Useful Heat-Setting Aromatic Polymer Resinous Compositions and Products," Ser. No. 65,578, and "Aromatic Resinous Curing System and Method," Ser. No. 665,303, of the present assignee, Hughes Aircraft Company.

The invention herein relates to an improved method of providing phenylene polymeric lacquer and plastic materials in uniform heat curable lacquer solution of improved homogeneous form and particularly to effecting homogeneous solution of the polymers produced from polymerization of terphenyls and quaterphenyls, mixtures of the same, and mixtures of the same with other phenyl material with no more than five aromatic rings, and preferably from ortho-terphenyl or meta-terphenyl, and isomers of triphenylbenzene, mixtures of the same, and mixtures of the same with other polyphenyls with less than five aromatic rings, providing polymers having a C:H atom ratio of at least 1:4, and more nearly on the order of 1.5 and slightly higher, prepared with a strong Lewis acid catalyst and oxidizing agent, and the products obtained therefrom in combination with an aromatic polymethylol curing material therefor, as disclosed in the application, "Aromatic Resinous Curing System and Method" of which I am co-inventor with Leroy J. Miller. More particularly, the invention relates to an improved method of incorporating the solvent soluble polyphenylene polymers with a copolymeric forming aromatic polymethylol compound curing agent and polymerization catalyst therefor in a free or associated state and which may be added separately or in prepolymer association therewith as a polyfunctional polysulfonate, and the like, facilitating improved homogeneous polyphenylene compositions in preparation of coating and impregnating vehicles, including varnishes and lacquers and plastic moldable products prepared therefrom, and the products produced thereby.

Phenylene polymers have been prepared from other starting materials and by other methods, but they have invariably been unsuitable for the purposes of producing heat curable, fusible and tractable polymers useful for lacquers or in laminated or molded structures of high thermal stability. The reason for this is that the polyphenylenes in the previous art have either been of very low molecular weight and nonthermosetting, or have been totally infusible and insoluble in organic solvents, or have been uncurable and commercially unfeasible. In those cases where the polymers of the previous art were fusible, the fusibility was generally due to the presence of aliphatic groups such as alkyl groups or olefinic groups in the polymer. Often these aliphatic groups were formed during the course of a polymerization and the reduced polymers were therefore technically other than the polyphenylene polymers utilized herein. A true polyphenylene polymer should have a carbon:hydrogen atom ratio of about 1.4 to 1.7, and on the order of 1.5 for utilization herein.

The following is a table of comparison illustrating typical phenylene oligomers in contrast to their C:H atomic ratios:

| Number of rings in chain | Examples | Phenylene oligomers |
|---|---|---|
| 3 | Terphenyl | 1.29 |
| 4 | Quaterphenyl | 1.33 |
| 5 | Quinquiphenyl | 1.36 |
| 6 | Sexiphenyl | 1.38 |
| 7 | Heptaphenyl | 1.40 |
| 20 | Icosaphenyl | 1.47 |
| 200 | | 1.50 |

From this table, it is apparent that as the degree of polymerization increases, the C:H atom ratio increases to a limiting value of about 1.5. Thus, those high molecular weight polymers which may be referred to as polyphenyls in published literature, but which have C:H atom ratios below 1.40, are obviously highly reduced products and would consequently have much lower thermal stability than fully aromatic polyphenylenes having a C:H atom ratio of and about 1.5.

Accordingly, it will be evident of the manner in which the polyphenylene polymers having a ratio of at least about 1.4 or higher are utilizable herein.

Due to the aliphatic groups in the indicated polyphenylenes of the previous art, it has not been possible to produce polyphenylenes possessing the thermal stability of a true theoretical polyphenylene. Heretofore reduced polyphenylenes having low thermal stability characteristics have always resulted when prepared as, for example, by Wurtz-Fittig reactions of haloaromatics with alkali metals.

True para polyphenylenes have been obtained by several investigators and molecular weights were reported to be as high as 10,000. Para polymers are, however, infusible. This is particularly true whenever there are more than eight or nine phenylene units in the chain. Consequently, fusible para polyphenylenes of high molecular weight have never been obtained. It is theorized that this is due to the extremely strong Van der Waals forces which the linear molecular structure allows. Infusible intractable para polyphenylenes thus are quite unsuitable for use in preparing varnish or lacquer compositions. Pure resin has been molded with heat and extreme pressure, such as 50,000–100,000 p.s.i. However, under these high pressures, reinforced laminates have not yet been achieved because of disintegration of the reinforcements under the high shear forces at these pressures.

Other polyphenylenes in the prior art have also been prepared from nitrogen-containing monomers through reactions such as diazotizations or nitrosations. Because such polyphenylenes invariably contain nonaromatic nitrogen, the polymers exhibit thermal stabilities far inferior to the true polyphenylenes.

The polyphenylene polymers to which the present invention appertains are described and claimed in a copending application, Ser. No. 349,770, filed Mar. 5, 1964, and entitled, "Phenylene Polymers," filed in the names of the present inventor and Leroy J. Miller, and continuation-in-part applications, as indicated. These polyphenylene polymers are fusible and tractable, apparently or presumably because of the presence of phenyl or biphenyl branches on the main polyphenylene chains. Such branches prevent the polymer molecules from attaining a planar molecular configuration as in the case of the infusible and intractable para polyphenylenes, for example, Consequently, close packing of the branched polymer molecules does not occur and the extremely high Van der Waals forces, which are noted in the para polymer, are not observed.

For many applications in the art of molding and fabricating laminated structures of high thermal stability, a high-temperature-stable polymer is not only desirable, but often essential. In conjunction with the ability to form prepolymers in solution with a curing agent, the principal characteristic of the branched phenylene polymers to which the present invention relates is the simultaneous possession of such feasible properties, as:

(1) The fully cured and postcured polymer has an excellent thermal stability exhibiting negligible weight loss between 400–500° C. in inert atmospheres;

(2) The uncured polymer and catalyst curing agent combination have sufficient solubility in mutually soluble organic solvents, such as mono-, di-, and trichlorobenzene, chloroform, tetrachloroethane, trichloroethylene, and toluene, especially when hot, to permit their use in thermosetting lacquers and varnishes; and (3) Prior to cure, fusibility and flow properties at temperatures between 20° C. and 250° C. are such as to permit the polymers to be molded under heat and pressure. It is this combination of properties, which makes the present composition unique and extremely valuable over other compositions in the art. Useful objects made with the polyphenylene polymer compositions include paint, varnish and lacquers, laminated products, electrical insulators, rocket nozzles, reentry bodies, and structural materials which are required to withstand high temperatures.

Polyphenylene polymers of the carbon to hydrogen ratio as described herein can be prepared as follows:

As the aromatic polymethylol curing agent component for the polyphenylene polymers, there is used the nonphenolic aromatic polymethylol compounds of the character of polymethylol benzenes or polyoxyxylylenes and derivatives thereof having structures such that the methylol groups are on the same or different benzene rings. Symbolic or characteristic formula structures of the copolymerizable curing agent material are indicated as follows:

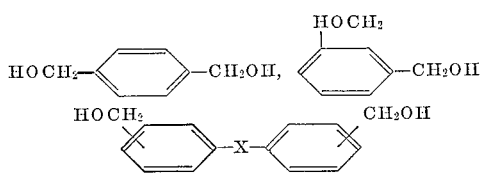

where x may be

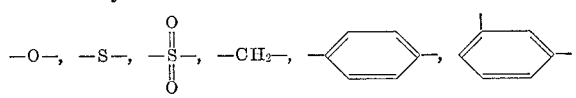

including hydrogen substitution in the ring with additional methylol groups and noninterfering alkyl, aryl, aralkyl, alkaryl and halogen groups, and mixtures of the same. Examples of some of the identifying compounds of this character are p-xylylene glycol; m-xylylene glycol; 1-methyl-2, 5-dimethylolbenzene; 1-phenyl-3, 5-dimethylolbenzene; 1-phenyl-2-methyl-3, 5-dimethylolbenzene; 4,4'-dimethylol biphenyl, and the like, including mixtures of such materials. Which are of the character described in more detail in the cofiled application entitled "Aromatic Resinous Curing System and Method," in which I am co-inventor with Leroy J. Miller, Ser. No. 665,303, and incorporated herein by reference thereto.

As the acid catalyst portion of the curing agent, I prefer using an aromatic sulfonic acid such as p-toluenesulfonic acid; benzenesulfonic acid; acetamidobenzenesulfonic acid, hexanesulfonic acid, cyclohexanesulfonic acid, and the like, including mixtures of the same. I may also employ phosphoric acids; alkyl- phosphoric acids; arylphosphonic acids; alkylphosphonous acids; arylphosphonous acids; sulfuric acid, mixtures of the same, and mixtures with other polymerization effecting acids. Such acids being in a free or associated state for effecting copolymerization of the polyphenylene and aromatic polymethylol compounds.

In order to realize the maximum benefits of the polyphenylene polymers in combination with a curing agent material, the thermosetting resins produced therewith should have a high degree of homogeneity. It has been found that the polyphenylene polymers described herein and in the aforementioned copending applications often were lacking in homogeneity because of the difficulty of getting or maintaining the polyphenylene polymers in solution in a solvent at a suitable "A" staging temperature when using an aromatic polyhydroxy compound and acid catalyst material as a curing agent therefor. Such agent being of the character of a polyoxyxylylene or aromatic polymethylol compound, as benzenedimethanol or telomers thereof in combination with an acid catalyst containing an arylsulfonic, arenesulfonyl, or similar group. This is especially true when the polyphenylene polymers have a mean molecular weight over 1500. When the mean molecular weight range is considerably below 1500, conventional dissolution procedures may be satisfactory. When the polyphenylene polymers have an average or mean molecular weight between 1500 and 2000, the herein described special lacquer forming process is preferably utilized to obtain more complete solubility and uniform results.

For example, the "A" staging process is desirably carried out at a temperature of less than 80° C. in order to maintain complete control over the preliminary "A" staging reaction procedure. On the other hand, maximum solubility of the polyphenylene polymers, especially if they are over 1500 molecular weight, is usually achieved only at much higher temperatures of the order of 140° C. or higher. If one employs only low boiling solvents at their normal boiling points in order to obtain a controllable rate of "A" staging, the resultant resin lacks homogeneity because of the sacrificed solubility of the polyphenylene. In contrast, if one employs excessively high boiling solvents in order to obtain high or complete solubility and hence a high degree of homogeneity, the "A" staging process is usually so rapid that the prepolymerization may advance to a stage where the lacquer is no longer useful. The problem therefore is how to obtain or maintain maximum solubility of the polyphenylene at the preferred low "A" staging temperatures and utilize therewith an operable curing agent and catalyst.

Accordingly, it is an object of the present invention to provide an improved method for processing thermosetting polyphenylene polymer compounds of a mean molecular weight on the order of 1500–2000 and more, and obtaining improved polyphenylene lacquer or varnish compositions.

Another object of the invention is to provide an improved method for homogeneously dispersing soluble polyphenylene resins and their curing agents in solvents and maintaining such homogeneous dissolution thereof at a temperature which permits controlled or partial interaction of the polyphenylene and the curing agent, thus permitting appropriate "A" staging of the thermosetting polymer.

Another object of the invention is to provide an improved process for making polyphenylene prepolymer lacquers or varnishes of substantially uniform homogeneity at relatively low and controllable "A" staging rates.

Another object of the invention is to provide an improved method for producing mutually soluable branched phenylene polymers in improved homogeneous combination with a curing agent and having substantially uniform homogeneity in paint vehicle, varnish or lacquer form and which provide fusible and useful molding and laminating compounds having controllable curing rates.

It is a further object of this invention to provide fusible, soluble and high-temperature-stable branched phenylene polymers in solution with a curing agent and catalyst and having substantially uniform homogeneity providing utility for various purposes such as lacquer, varnish, molding, or laminating compounds.

In general terms, these and other objects and advantages of the present invention are achieved by utilizing, in the first step, solvents for the polyphenylene polymers which have a boiling point high enough to permit the polyphenylene polymers to be heated to the temperature at which they are completely dissolved therein. This temperature is often considerably higher than the desired "A" staging temperature of the polyphenylene polymers. Thereafter, methods and means are provided for modifying the uncured polyphenylene solution so that at the lower desired "A" staging temperatures the polyphenylene polymers still remain substantially completely in solution in one or more of the solvent combinations. This latter phenomenon has been achieved by adding sufficient quantity of another mutual solvent having a much lower boiling point to the first step polyphenylene polymer solution so as to lower the temperature thereof without sacrificing solubility of the polyphenylene polymers and which additional solvent, in some applications, is capable of evaporating and carrying away with it the first solvent without affecting the coating, laminating and molding properties of the polyphenylene polymer and catalyst combination.

Solvents suitable for use in the process of the present invention are chlorinated aromatic and aliphatic solvents such as chlorobenzene, chloroform, tetrachlorethane, and trichloroethylene, for example. It is desirable that the solvent for use in what may be called the "second" step of the process of the invention has a lower boiling point than that of the solvent for use in the "first" or polyphenylene polymer dissolution step so that both the solvents may be driven off at the appropriate time by heating or evaporation. A solvent with a lower boiling point, if present in sufficient quantity, will carry off with it the higher boiling point solvent. The "first" step solvent should have a boiling point high enough to permit heating the polyphenylene polymers to at least the temperature at which the polyphenylene polymers exhibits maximum solubility without boiling off the solvent. In general, in order to insure that the "second" step solvent will carry off the "first" step solvent, the "second" step solvent is added to the initial solution of solvent and polyphenylene polymers in a ratio of at least 3:1. However, as it is also possible to remove the solvents at the desired time by techniques other than heating and evaporation at ambient pressure, particularly by vacuum drying, for example, this ratio of solvents is by no means necessary or critical. The more fundamental criterion as to solvent proportions is the curing temperature or evaporation rate to be employed. One wants to end up with a "mix" including the curing agent and polyphenylene polymer solution, as well as other additives which do not require the employment of temperatures much above the optimum controllable curing temperature which for the most desirable curing agents is somewhat less than 80° C. However, it will be appreciated that this goal is not determined solely by the mixture proportions of the two solvents in the polyphenylene polymer solution since the final "mix" may include other modifying additives, including pigments, inert filling agents and the like which permit the establishment of a "mix" curable at the desired low temperature while not requiring higher temperatures to permit this and other desired reactions to be carried out.

The method of practice of the process of the present invention is described and illustrated in greater detail in the following nonlimiting examples illustrating components, compositions and products and their method of preparation. Accordingly, additional objects and advantageous will be recognized from the description embodied herein. To the accomplishment of the foregoing and related ends, this invention then comprises the features of discovery herein set forth by illustrative embodiments and as particularly pointed out in the claims.

EXAMPLE I

A curing agent solution was prepared from a mixture of 75 ml. of chloroform, 7:5 grams of $\alpha$, $\alpha'$-dihydroxy-p-xylylene, and 2.25 grams of p-toluenesulfonic acid monohydrate and was heated at reflux for 40 hours. Water was constantly removed from the reaction mixture by trapping it in an azeotropic trap. Traces of undissolved solids were removed from the curing agent solution by filtration.

A phenylene polymer solution was prepared by dissolving 15 grams of a phenylene polymer having a C:H ratio in excess of 1.4, a molecular weight of from about 1500 to 2000 and which melted between 150–230° C., in about 25–30 ml. of tetrachloroethane at a temperature of about 140–150° C., and on the order of 145° C. which is just below the boiling point (146.3°) of this solvent. Thereafter, about 90 ml. of trichloroethylene, which has a boiling point of about 87° C., was added to the somewhat cooled phenylene polymer solution. The phenylene polymer remained completely in solution at the lower boiling point.

Thereafter, a lacquer was prepared by adding the prepared curing agent solution to the above phenylene polymer solution and subsequently heating the mixture at a temperature of about 70° C. for about 24 hours. The lacquer thus prepared contains about 6–7% solids, however, it can be concentrated to a higher solids content, up to 100%, by removal of part or all of the solvent by distillation. Partial to total evaporation of solvent by heat (below 70° C.) and vacuum, yields from higher concentrations to heat curable plastic molding compounds. The solvent solution is available for use as a coating vehicle for mixing with suitable inorganic or organic fillers and dyes, or as a thermosetting lacquer, for impregnation and lamination. In the partially reacted plastic form, the composition mixture has an initial flow temperature suitable for molding, and in either case can be post-cured and subsequently exhibit very little weight loss, as hereinafter described.

EXAMPLE II

A curing agent solution is prepared in the same manner as in Example I.

A phenylene polymer solution was prepared by dissolving 15 grams of a phenylene polymer, having a C:H atom ratio of from 1.4 to 1.7 and which melts between 180–230° C., in about 25–30 ml. of chlorobenzene at a temperature of about 140° C. Thereafter, about 90 ml. of trichloroethylene, having a much lower boiling point (about 87° C.) was added while the solution is maintained at its new, lower, boiling point for 1–2 hours.

A lacquer solution was prepared by adding the above curing agent solution to the above phenylene polymer solution and subsequently heating the mixture at a temperature of about 70–75° C. for about 20–24 hours. The lacquer thus obtained was used as a varnish in laminate fabrication, as herein described. Otherwise, the solution mixture can be concentrated to a higher solids content or to a solid state, by carefully evaporating off part or all of the solvent.

If adequate care is taken not to overheat the polymer solution, all the solvent may be removed by heat and vacuum and the solid polymer can be used as a heat curable molding compound, having a flow temperature between 150° C. and 250° C.

EXAMPLE III

This example is identical to Example I except that 2.0 grams of benzene sulfonic acid mono hydrate is used as catalyst instead of p-toluenesulfonic acid.

EXAMPLE IV

A curing agent solution was prepared in the manner as set forth in Example I, utilizing as the aromatic bis-hydroxymethyl compound and acid curing agent 1,4-benzenedimethanol and hexanesulfonic acid.

A polyphenylene polymer solution was prepared of polyphenylene polymers in the mean molecular weight range of about 1500 to 2000, having a C:H atom ratio of over 1.4 and on the order of 1.56, in combination with the above curing agent by treatment as described in Example II.

The herein defined process, as described and claimed, is applicable to an appropriate application of a solvent of relatively high boiling point for solubilizing the polyphenylene polymer composition and subsequently reacting the soluble solution of polyphenylene material with a curing agent solution of mutually compatible solvent of lower boiling point and in which the partial reaction mixture remains in dispersed form, providing more homogeneous compositions of the polyphenylene polymers and curing agent combinations as described and disclosed in the herewith filed and copending applications, as indicated.

The reaction products are thermosetting prepolymer lacquers, varnishes, or plastic materials in homogeneous composition with the curing agent and which are stable for working with under normal operating conditions. Upon evaporation of the solvent, the prepolymers mold at lower temperatures ($\simeq$400° F.), and pressures of 500 p.s.i. to 3000 p.s.i. to produce superior substantially completely aromatic resins in coatings, plastic forms and laminates having greater strength and superior hyperthermal properties than those of the conventionally used and known resin type.

For utilizing the above prepared "A" stage polyphenylene prepolymers in a molding process, it is preferred to dry and/or advance the resin by first carefully evaporating the solvent from the prepared mix, air drying the plastic and heating for 10 to 30 minutes in a vacuum oven at 160° F., before molding. Thereafter, the resin is mold curable between 350°–450° F. under pressures of 500–3000 p.s.i. in a short period of time up to about 2 hours. Post-curing of the molded specimens by the following procedural steps is preferred:

(1) 18 hours at 274° F.
(2) 108 hours during which the temperature is programmed from 274° to 600° F.
(3) 1 hour at 600° F.
(4) Gradual cooling in oven to 200° F.

By this processing, best results are obtained in forming electrical insulators, rocket nozzles, reentry bodies and other structural materials, including fabrication of laminate structures having a post-cured property of thermal stability when analyzed by thermogravimetric analysis (in $N_2$, 360 C./hr. rate of temperature increase) comparable to:

3% wt. loss at 752° F. approx. 400° C.
6% wt. loss at 932° F. approx. 500° C.
10% wt. loss at 1112° F. approx. 600° C.
20% wt. loss at 1292° F. approx. 700° C.

Thus, the heat cured and molded polymeric materials are particularly applicable to the high temperature of space technology and more suitable in many commercial applications requiring heat stability.

In preparation of the above, the polyphenylene polymers of a soluble and fusible character, as described, are the soluble and fusible polymers of monomer compounds selected from the group consisting of biphenyl, ortho- and meta-terphenyls, the 2,2'-, 3,3'- 2,3'-, 2,4'-, 3,4'-diphenyl biphenyls, 1,2,3-, 1,2,4-, and 1,3,5-triphenylbenzenes, mixtures thereof, and mixtures thereof with other phenylene oligomers and polyphenyls with not more than five aromatic rings. Less preferably, but, if desired, a small amount of benzene up to about ⅓ by weight may be used with the above. If too much benzene is used, an intractable material is obtained. The para monomer is not adaptable to being polmerized above for producing the desirable fusible and tractable polyphenylene polymers, but less preferably may be present in a polymer mixture with the above polymerized monomers, as a combination mixture, with retention of the desirable polymers in predominantly tractable, fusible and curable form.

As described and provided herein the polyphenylene polymers having the characteristics defined are used in the examples. Such polyphenylene polymers may be copolymers of biphenyl and m-terphenyl, or poly (m-terphenylene), or poly (o-terphenylene), or poly (biphenylene) or other such polymers of the monomers and mixtures of monomers, as described.

Having described the present embodiment of improvement in developing a practical application of polyphenylenes in the art in accordance with the Patent Statutes, it will be apparent that some modifications and variations may be made without departing from the spirit and scope thereof. The specific embodiments described are given by way of examples illustrative of the improvement as embodied in the terms of the appended claims.

What is claimed is:

1. The process of "A" staging in preparing a homogeneous liquid polyphenylene polymer coating solution comprised of copolymerized fusible and soluble polyphenylene polymers having a molecular weight range of about 1500 to about 2000, said polyphenylene polymers being derivatives of polymerized phenylene oligomers and polyphenyl monomers and having a carbon to hydrogen ratio of over 1.4 and in the order of 1.4 to 1.7 in combination with an aromatic polymethylol compound in a partially cured state, comprising the steps of:

(a) preparing a mixture of said polyphenylene polymers in a solvent having a boiling point higher than the total solubility temperature of said soluble polyphenylene polymers;
(b) heating said solution to said maximum solubility temperature of said soluble polyphenylene polymers and dissolving said polymers in said solvent;
(c) lowering the temperature of said prepared solution mixture and adding to said solution a second solvent having a boiling point substantially lower than said maximum solubility temperature solvent for said polymers;
(d) adding to said polymer solution a curing agent combination comprised of an aromatic polymethylol compound selected from the group consisting of polymethylol benzenes having characteristic or symbolic formula structures:

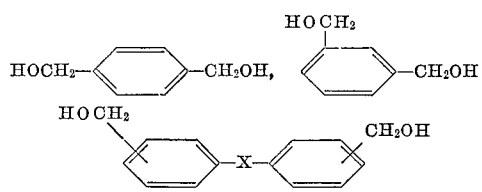

where X may be

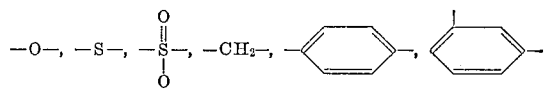

including hydrogen substitution on the ring with additional methylol groups and nonsteric interfering alkyl, aryl, aralkyl, alkaryl and halogen groups, and mixtures of the same, and acid polymerization catalyst therefor selected from the group consisting of aromatic sulfonic acid, phosphoric acid, alkylphosphoric acid, arylphosphonic acid, alkylphosphonous acid, arylphosphonous acid, sulfuric acid, and mixtures of the same; in a solvent which permits said curing agent solution to be homogeneously mixed therein and forming a compatible solution with said polymer solution;

(e) heating the mixture on the order of about 60° to about 140° C. to effect partial polymerization of said polyphenylene polymers and said aromatic polymethylol compound, and;

(f) recovering a homogeneously dispersed prepolymer solvent solution of said polyphenylene polymers partially copolymerized with said aromatic polymethylol compound.

2. The process of claim 1 wherein said first solvent is a halogenated solvent.

3. The process of claim 1 including the additional step of further heating the said solution of said copolymerized polyphenylene and curing agent to an advanced stage of polymerization.

4. The process of claim 1 including the additional steps of removing the solvent portion and obtaining a fusible plastic partial polymer of heat setting polyphenylene resin and curing agent.

5. The product obtained by the process of claim 1 wherein the polyphenylene is a polymer selected from the group consisting of polymerized monomers of biphenyl, ortho-terphenyl, meta-terphenyl, 2,2'-, 3,3'-, 2,3'-, 2,4'-, 3,4'-, diphenyl biphenyls, 1,2,3-, 1,2,4-, and 1,3,5-triphenylbenzene, isomers thereof, mixtures of the same, and mixtures of the same with other aromatic material with not more than five aromatic rings.

6. The product produced by the process of claim 1.
7. The product produced by the process of claim 2.
8. The product produced by the process of claim 3.
9. The product produced by the process of claim 4.

References Cited

UNITED STATES PATENTS

| | | | |
|---|---|---|---|
| 3,082,177 | 3/1963 | Anderson | 260—2 |
| 3,159,589 | 12/1964 | Bloomfield et al. | 260—2 |
| 3,336,259 | 8/1967 | Zimmerman et al. | 260—47 |
| 3,431,221 | 3/1969 | Hoess | 260—2 |
| 3,338,844 | 8/1967 | Harris et al. | 260—2 |
| 3,423,335 | 1/1969 | Phillips | 260—2 |

FOREIGN PATENTS

| | | | |
|---|---|---|---|
| 1,000,679 | 8/1965 | Great Britain | 260—2 |

WILLIAM H. SHORT, Primary Examiner

M. GOLDSTEIN, Assistant Examiner

U.S. Cl. X.R.

260—2, 33.6, 47, 79, 79.3